Nov. 16, 1926.
O. S. NEILL
PRODUCTION OF FERRIC OXIDE
Filed Nov. 14, 1925
1,607,206
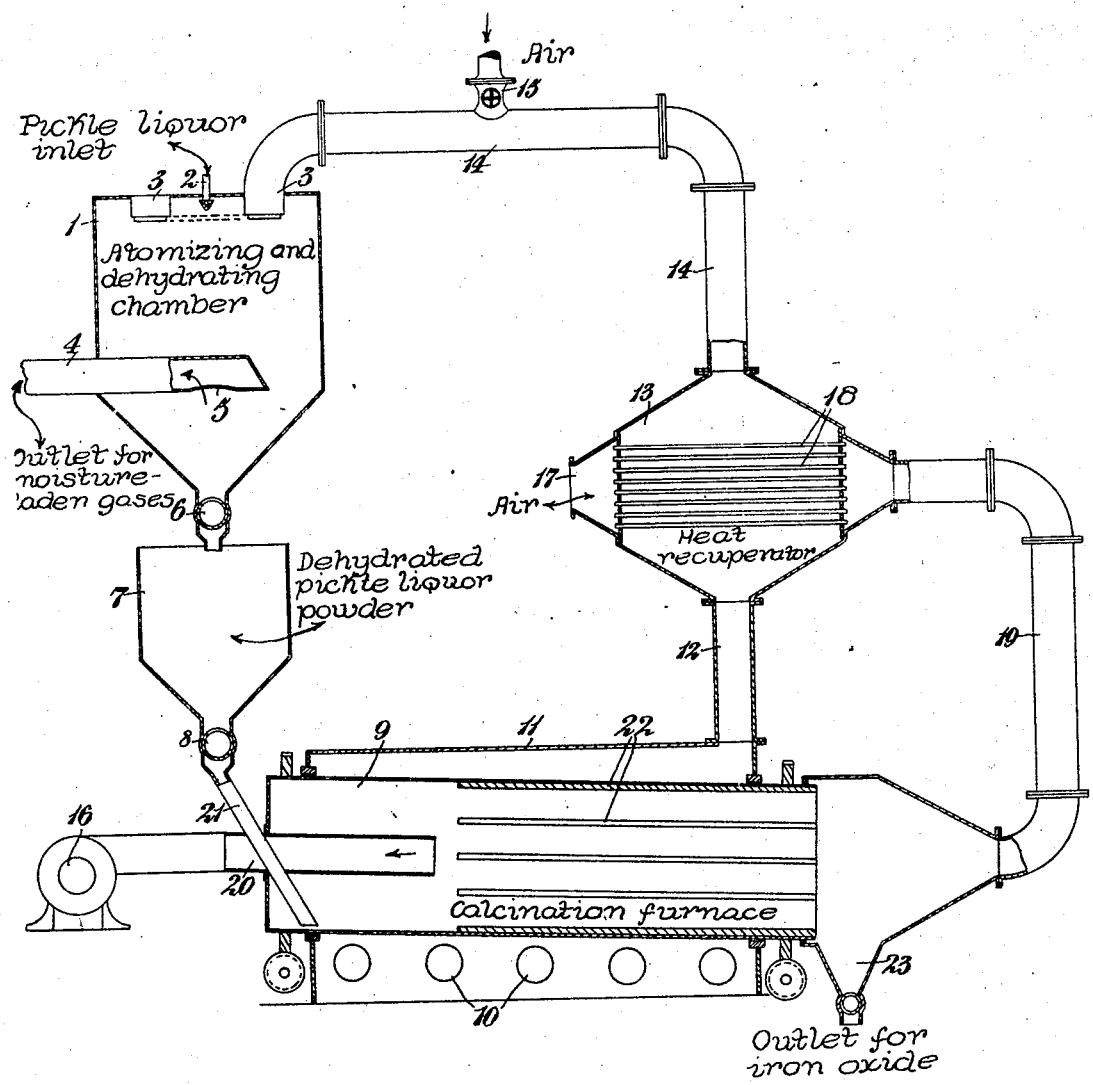

Patented Nov. 16, 1926.

1,607,206

UNITED STATES PATENT OFFICE.

OSWALD STUART NEILL, OF SYDNEY, NEW SOUTH WALES, AUSTRALIA.

PRODUCTION OF FERRIC OXIDE.

Application filed November 14, 1925, Serial No. 69,143, and in Great Britain October 24, 1924.

This invention relates to the production of iron oxide from solutions containing iron compounds such as waste pickle liquors, and has as its object to provide a process whereby iron oxide can be obtained from such solutions in a continual, economic and almost automatic manner so that there is no man-handling from the time the liquor enters the plant to the time when the oxide is packed.

So far as I am aware, in the known methods of producing oxide of iron from solutions containing iron compounds, the first step is to concentrate the solutions so as to obtain the iron compounds in hydrated crystalline form or in cake form. When in hydrated crystalline form the product has then to be heated to drive off water and this results in the agglomeration of the dehydrated substance into a cake. In both cases, that is to say, whether the cake has been obtained from dehydrated crystals or in other ways, the product has to be ground before it is calcined. It has been suggested to grind the resultant product to the order of 30 meshes and upwards, prior to heating the same (placed in trays or travelling through revolving inclined iron tubes) within furnace retorts for converting the dehydrated products into the oxide.

It has also been proposed to atomize solutions of iron salts under pressure into the top of a chamber through which, in upward direction, a current of heated air or gas is passing, in order to form anhydrous iron sulphate or chloride, but such process did not contemplate the direct and continuous production of iron oxide which is the object of this invention.

Furthermore, it has never, so far as I am aware, been realized that the more finely divided is the dehydrated product the more easy is its conversion into an oxide of over 90% purity.

According to the process of this invention I can obtain economically, directly and continuously, an iron oxide of over 90% purity by utilizing atomization to sub-divide a solution of an iron compound; heated air or heated gases or heated gases admixed with heated air to convert the sub-divided liquid particles into powder form and a specially constructed furnace, which is described hereinafter, to calcine the very fine powder in the presence of air to the oxide.

The process of the invention therefore consists in spraying or atomizing a solution of an iron compound such as a waste pickle liquor into an atmosphere of heated air or heated gases or mixtures of heated air and heated gases; separating the moisture laden air, gases or gaseous mixture from the finely divided and dried or partially dried particles of dehydrated product and conducting this latter, while still hot, into a calcination furnace where it is heated, if neecssary, up to a temperature of about 200° C. or over before it is subjected to the influence of the calcining heat and to the action of air for converting it into oxide of iron and gaseous by-products which can be recovered in known manner.

The accompanying drawing illustrates diagrammatically and by way of example only a plant for producing oxide of iron in accordance with this invention.

Referring to the drawing a waste pickle liquor is introduced into a chamber 1 constructed of fireproof material through any known type of atomizer, represented by 2. A current of heated air or gas or mixture of air and gas or gases is introduced through the annular distributor 3; the atomized liquor and air etc. thus pass in the same downward direction. The moisture laden air, gas or mixture of air and gas or gases is drawn by way of the pipe 4 through the outlet 5 by means of a fan (not shown), while the dehydrated product in powder form passes on to the hopper like bottom of the chamber 1 whence it is discharged at intervals through an automatic air-tight outlet valve 6, preferably of the revolving port type, as shown. The valve 6 is necessary because there is a slight degree of vacuum in the chamber 1, due to the drawing action of the fan on the pipe 4. The powder leaving the outlet 6 passes by gravitation into a hopper 7 which delivers by way of an automatic feeder 8, a regular feed to the calcination furnace 9. The only object of the hopper 7 is to ensure a regular feed to the calcination furnace irrespective of the output from the chamber 1. The furnace 9 of the rotary type and slightly inclined, is externally heated, such as by oil or gas jets 10 in the walls of a chamber 11 in which the furnace 9 is enclosed. The combustion products pass off by the pipe 12 through a recuperator 13 and on through the pipe 14 to the annular distributor 3. A valved inlet 15 is connected to the pipe 14 for the admission of regulated quantities of air. By means of a fan 16 air is drawn by way of the inlet 17 through pipes 18 of the recuperator 13, wherein it is heated, and thence through a pipe 19 into the calcination furnace 9; it passes out of the furnace through the pipe 20, which, as shown, extends some distance into the furnace. The powder fed in from the hopper 7 passes through a stationary pipe 21, the outlet end of which is placed well behind the open end of the pipe 20. In this way the very fine powder has time to acquire a temperature above 200° C. before it arrives at the flights 22 fixed to the wall of the furnace 9, and is brought by them into contact with the air current passing through the furnace. I have found that the finely divided product, when cold, has a great tendency to dust and that if it is led directly into contact with the air current in the furnace it gets carried off in the same.

By means of the special construction of the feed inlet-end of the furnace in accordance with this invention, a portion of the furnace is kept free of air current and the powder is in consequence able to acquire a temperature above which it will no longer dust or be carried off by the air current when brought into contact with the same.

The flights 22 enable the product to be picked up and to be distributed through the hot air. The oxide which is over 90% purity is ultimately discharged from the furnace and is removed from the plant by way of the outlet 23.

If desired, a separate by-pass (not shown) can be fitted between the heating chamber for the furnace and the chamber 1 to allow for additional heat for drying the atomized waste pickle liquor when the calcination furnace is working at low temperature. The passage of the gases to the chamber 1 and the passage of the air through the calcination furnace are of course kept under careful control.

The air current should be regulated so that not more than about 8 per cent of $SO_3$ is in the calcination furnace at the same time, because otherwise a reverse chemical action may take place. The gases leaving the calcination furnace 9 by way of the pipe 20 are, if desired, conducted to absorption towers and recovered as by-products in known manner.

By varying the temperature, the time-lag and the amount of air passing through the furnace it is possible to control the resultant shade of colour of the oxide obtained which removes the necessity of blending to obtain a required colour. The temperature of the furnace ranges between 500–900° C. according to the shade required. The invention is applicable not only to solutions of iron compounds but to liquids containing iron compounds like ferric hydrate, these being atomized or sprayed with the object of driving of the water.

The size of the particles of the final product will naturally depend upon the degree of atomization effected, and this in itself offers an advantage.

Ferris oxide produced by the process of this invention may be utilized, for example, for pigment purposes, or as a catalyzer for use in, for instance, the synthesis of ammonia.

What I claim is:—

1. A two-stage process for the production of ferric oxide from aqueous mixtures containing iron compounds, comprising the steps of atomizing a liquor into a chamber to produce a basic iron compound in the form of a finely-divided powder; subjecting said powder, in a separate, externally-heated chamber, to a preheating treatment; and thereafter converting it into ferric oxide in said externally-heated chamber in the presence of a gaseous mixture containing oxygen while repeatedly dropping the powder through said oxygen-containing gas.

2. A two-stage process for the continuous production of ferric oxide from aqueous mixtures containing iron compounds, comprising the steps of atomizing a liquor into a chamber through which a heated gaseous mixture is passing; withdrawing the moisture-laden gaseous mixture from said chamber; conducting the basic iron compound remaining in finely-divided powder form to an externally-heated furnace; and then calcining it to ferric oxide in the furnace in the presence of an oxygen-containing gas while repeatedly dropping the powder through said oxygen-containing gas.

In testimony whereof I affix my signature.

OSWALD STUART NEILL.